(12) United States Patent
Vanttinen et al.

(10) Patent No.: US 10,377,951 B2
(45) Date of Patent: Aug. 13, 2019

(54) PYROLYSIS APPARATUS

(71) Applicant: Ecomation Oy, Salo (FI)

(72) Inventors: Juhani Vanttinen, Harkala (FI); Tommi Pajala, Salo (FI)

(73) Assignee: ECOMATION OY, Salo (FI)

( * ) Notice: Subject to any disclaimer, the term of this patent is extended or adjusted under 35 U.S.C. 154(b) by 264 days.

(21) Appl. No.: 15/102,008

(22) PCT Filed: Dec. 4, 2014

(86) PCT No.: PCT/FI2014/000037
§ 371 (c)(1),
(2) Date: Jun. 6, 2016

(87) PCT Pub. No.: WO2015/082755
PCT Pub. Date: Jun. 11, 2015

(65) Prior Publication Data
US 2016/0326439 A1 Nov. 10, 2016

(30) Foreign Application Priority Data

Dec. 4, 2013 (FI) .................................. 20130369

(51) Int. Cl.
*C10B 7/10* (2006.01)
*C10B 33/04* (2006.01)
(Continued)

(52) U.S. Cl.
CPC ................ *C10B 7/10* (2013.01); *C10B 19/00* (2013.01); *C10B 27/06* (2013.01); *C10B 31/00* (2013.01); *C10B 33/04* (2013.01); *C10B 33/06* (2013.01); *C10B 35/00* (2013.01); *C10B 47/44* (2013.01); *C10B 53/07* (2013.01); *Y02P 20/143* (2015.11)

(58) Field of Classification Search
CPC ........... C10B 7/10; C10B 19/00; C10B 27/06; C10B 31/00; C10B 33/04; C10B 33/06; C10B 35/00
See application file for complete search history.

(56) References Cited

U.S. PATENT DOCUMENTS

| 4,123,332 A | 10/1978 | Rotter .............................. 201/15 |
| 4,181,459 A * | 1/1980 | Price ....................... C10B 31/04 198/502.2 |

(Continued)

FOREIGN PATENT DOCUMENTS

| GB | 2301112 A | 11/1996 |
| GB | 2502126 A | 11/2013 |

(Continued)

*Primary Examiner* — Renee Robinson
(74) *Attorney, Agent, or Firm* — Kubovcik & Kubovcik

(57) ABSTRACT

Pyrolysis apparatus (10) for processing shredded waste material, such as plastic and/or rubber waste, in which apparatus the material is processed continuously in a pyrolysis apparatus (10) that includes a feed device (30), a reactor (30) and an outlet portion (40) that have been equipped with conveyors, such as screw conveyors, and that can be used continuously. The screw (23) of the feed device (20) is at least partially placed in a liquid (22), which forms an air trap to prevent air from entering into the reactor. The outlet portion has a condensing collecting canopy (45) which is used to condense into liquid and recover the vapor formed in the reactor.

5 Claims, 6 Drawing Sheets

(51) Int. Cl.
*C10B 35/00* (2006.01)
*C10B 31/00* (2006.01)
*C10B 19/00* (2006.01)
*C10B 33/06* (2006.01)
*C10B 47/44* (2006.01)
*C10B 53/07* (2006.01)
*C10B 27/06* (2006.01)

(56) References Cited

U.S. PATENT DOCUMENTS

| | | | | |
|---|---|---|---|---|
| 4,983,278 | A | 1/1991 | Cha et al. | 208/407 |
| 5,464,503 | A * | 11/1995 | Avetisian | C10B 7/10 |
| | | | | 201/25 |
| 5,720,232 | A | 2/1998 | Meador | 110/346 |
| 2004/0079262 | A1* | 4/2004 | Hornung | C10B 7/10 |
| | | | | 110/246 |

FOREIGN PATENT DOCUMENTS

| WO | 9320396 | A1 | 10/1993 |
|---|---|---|---|
| WO | 9908849 | A1 | 2/1999 |
| WO | 2013095163 | A1 | 6/2013 |

* cited by examiner

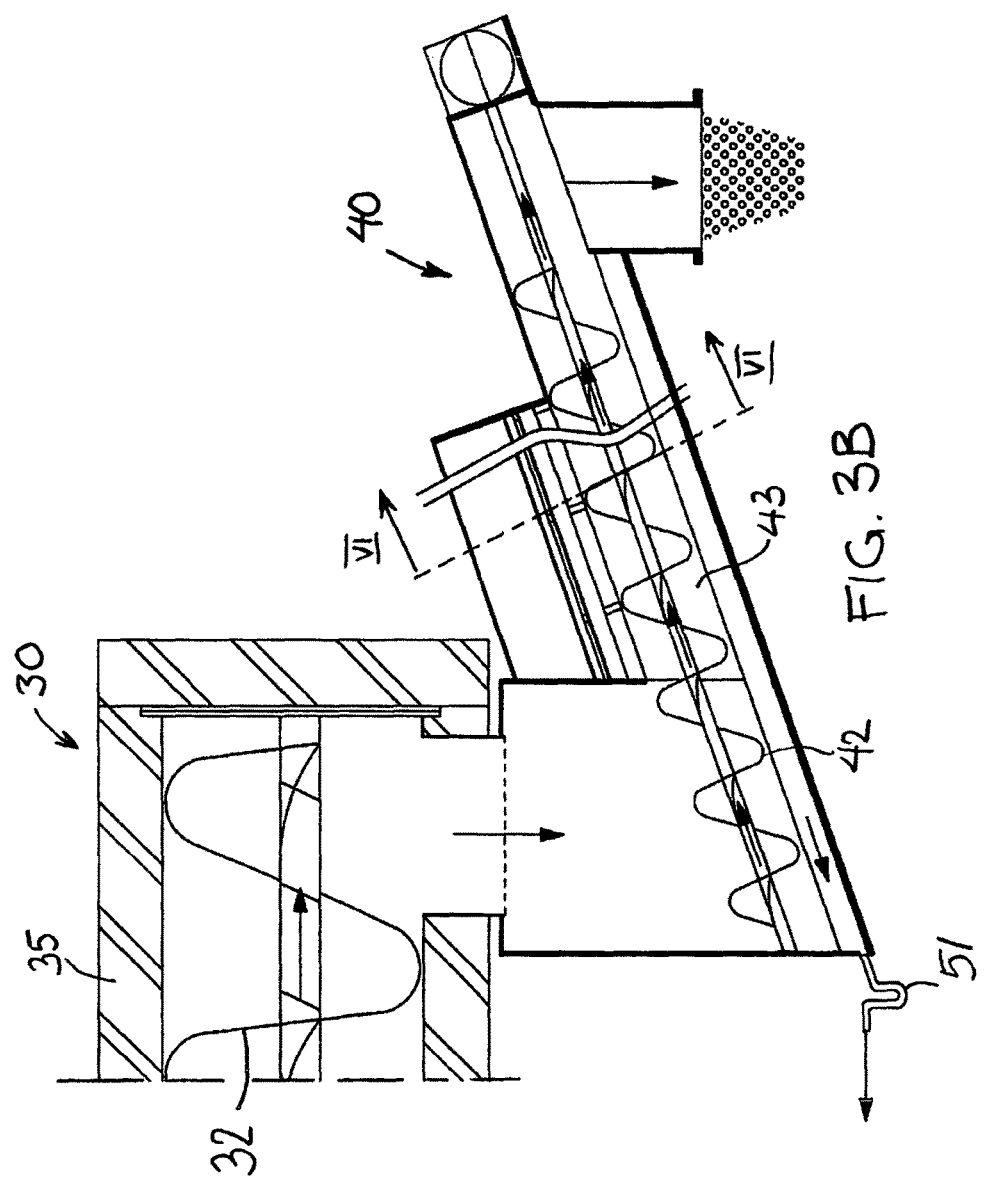

PYROLYSIS APPARATUS

The object of the invention is a pyrolysis apparatus presented in the preamble to claim 1 for processing shredded waste material, such as plastic and/or rubber waste. The pyrolysis apparatus includes a feed device, a pyrolysis reactor, an outlet portion and a gas collector.

Pyrolysis, i.e. dry distillation, is a chemical reaction wherein organic solids are decomposed by heating without allowing oxygen to influence the process. Pyrolysis usually uses either a vacuum, as is the case in vacuum pyrolysis, or an inert atmosphere, such as nitrogen, to supplant atmospheric oxygen. As a general rule, industrial pyrolysis reactions take place at temperatures of 300 to 700° C. Known pyrolysis apparatuses have been presented in the publications U.S. Pat. No. 4,983,278 A, WO-2013095163 A1, GB-2502126 A, WO-9909948 A1 and WO-9320396 A1.

In the pyrolysis apparatus, waste that contains hydrocarbons, for example plastic and/or rubber waste, is processed such that the process mainly produces oil, carbon and gas. According to a known method, plastic and/or rubber waste is shredded and the shredded material is placed in a pyrolyser chamber. The chamber is locked to make it air-tight with an air trap which usually also is the rotary feeder for the material to be processed. Known pyrolyser chambers are usually batch-type devices which therefore have no continuous feed. In some continuous pyrolyser chambers, the rotary feeder is, for example, a blade wheel, which serves as the chamber's air trap.

In known pyrolysis apparatuses, energy consumption is fairly high as the pyrolyser chamber is usually heated by burning the gas generated in the process. In this case, a significant part of the energy goes to waste due to the structures of the necessary combustion chamber and smokestack, which results in poor overall efficiency of the method and apparatus. The heat is also often distributed disadvantageously, focusing only on a certain part of the pyrolyser chamber. Distributing the heat generated by a gas flame more evenly leads to complicated solutions, such as having to continuously rotate the pyrolyser chamber, which, in turn, leads to difficult sealing problems.

The purpose of the invention is to create a pyrolysis apparatus for processing shredded waste material, such as plastic and/or rubber waste, that overcomes the above-mentioned drawbacks. The pyrolysis apparatus according to the invention is characterized in what has been presented in the characteristics section of claim 1.

The pyrolysis apparatus according to the invention is continuous and the feed device of the pyrolysis apparatus includes a conveyor, such as a screw conveyor screw that is at least partially placed in a liquid, such as oil, which forms an air trap to prevent air from entering into the reactor. To limit the transfer of oil from the feed device into the reactor, the conveyor of the feed device of the pyrolysis apparatus, such as a screw conveyor screw, has been arranged to compress the feed material such that at least part of the liquid transported with the material falls into the gutter of the screw conveyor and flows back into the liquid contained in the feed bin. Most advantageously, the screw conveyor screw has also been equipped with a timer which sequentially consecutively starts and stops the forward movement of the conveyor, such as the rotary movement of the screw, such that the changes in the movement cause at least part of the liquid transported with the material to fall into the gutter of the conveyor and flow back into the liquid contained in the feed bin.

The reactor of the pyrolysis apparatus includes a conveyor, such as a conveyor screw, for moving the material and heating resistors for heating the reactor. The steel pipe forming the pyrolysis reactor has been thermally insulated by coating it with heat-resistant industrial MT or HT insulation wool or ceramic wool. The outlet portion of the pyrolysis apparatus also includes a conveyor, such as a discharge screw, and a condensing collecting canopy which is used to condense into liquid and recover the vapour formed in the reactor.

The gas collector of the pyrolysis apparatus has a liquid-filled tub and, placed in this tub, a collecting member, such as another tub that has been turned upside down and equipped with a flotation device to collect the gas entering the gas collector. Most advantageously, the tub of the gas collector has been equipped with upper and lower limit switches that control the gas outlet compressor connected to the gas collector such that the compressor sucks the gas accumulated in the other tub equipped with a flotation device into the pressure tank sequentially when the tub equipped with a flotation device has reached the permitted upper limit.

In the pyrolysis apparatus according to the invention, material can be fed into the process without having to shred it nearly as finely as with conventional air trap rotary feeder solutions. In addition, fibers, such as steel belt materials in car tyres, do not cause any problems in this case. This enables, in addition to a continuous process, significant energy savings as the need for shredding diminishes. In addition, if the process uses so-called catalyst chemicals, the use of liquid considerably facilitates the dosing of the chemical and the spreading of the substance and the catalyst can be in both pulverulent and liquid states.

In the solution according to the invention, electric energy is used for heating the pyrolysis reactor, which means that the process heat can be adjusted with high precision and focused as even radiant heat on the reactor. This makes it possible to minimise the process's energy consumption compared to solutions where heating is performed using the gas produced in the process in the form of a flame. In known solutions, when gas is used for heating the reactor, a significant part of the energy goes to waste. This kind of apparatus necessarily requires a smokestack and other structures which, due to the intense heat from the flame that is focused on a specific area, cannot be properly insulated, which results in the heat also being distributed unevenly. A structure that would make efficient use of gas would also be very complicated and difficult to maintain. In the solution according to the invention, the reactor also does not need to be rotated, which eases the sealing problems and heat loss that always occur in known rotating reactors. The solutions according to the invention improve the overall efficiency of the process and the quality of the end products, which have presented major problems in known car tyre pyrolysis solutions. In terms of the overall energy economy, it is thus more profitable to recover and pressurise the gas to make it suitable for traffic use, for example.

Practice has shown that some pyrolysis vapour may also be conveyed in connection with the removal of carbon. When condensing into liquid in the discharge screw, this deteriorates the quality of the carbon as it mixes with the dry carbon. Thanks to the discharge screw structure according to the invention, this can be prevented and the vapour can be condensed, in a controlled manner, into liquid that is recovered.

In the pyrolysis process according to the invention, the gas flow is, most advantageously, very light, as the pressure is low and its accumulation may cause the discharge of gas at the feed and carbon outlet end. If the flow stops, it causes condensation in the reactor which can weaken efficiency. When gas starts coming out of the outlet pipe in the solution according to the invention, the condenser and the other tub placed in the distillation system start to rise even at a lighter pressure, keeping the collection hermetically sealed the entire time, which is a prerequisite for being able to utilise the gas. The liquid in the tub simultaneously serves as a coolant for the gas to make its compression easier. The liquid is circulated through the condenser system of the process.

In the following, the invention is described using examples with reference to the appended drawings, in which

LIST OF FIGURES

FIG. 1 shows a pyrolysis apparatus according to the invention.
FIG. 2 shows the feed portion of the pyrolysis apparatus.
FIG. 3 shows the reactor portion of the pyrolysis apparatus.
FIG. 3B shows the outlet portion of the pyrolysis apparatus.
FIG. 4 shows the gas collector of the pyrolysis apparatus.
FIG. 5 shows a cross-section of the feed portion of the pyrolysis apparatus.
FIG. 6 shows a cross-section of the outlet portion of the pyrolysis apparatus.

Figure 1:
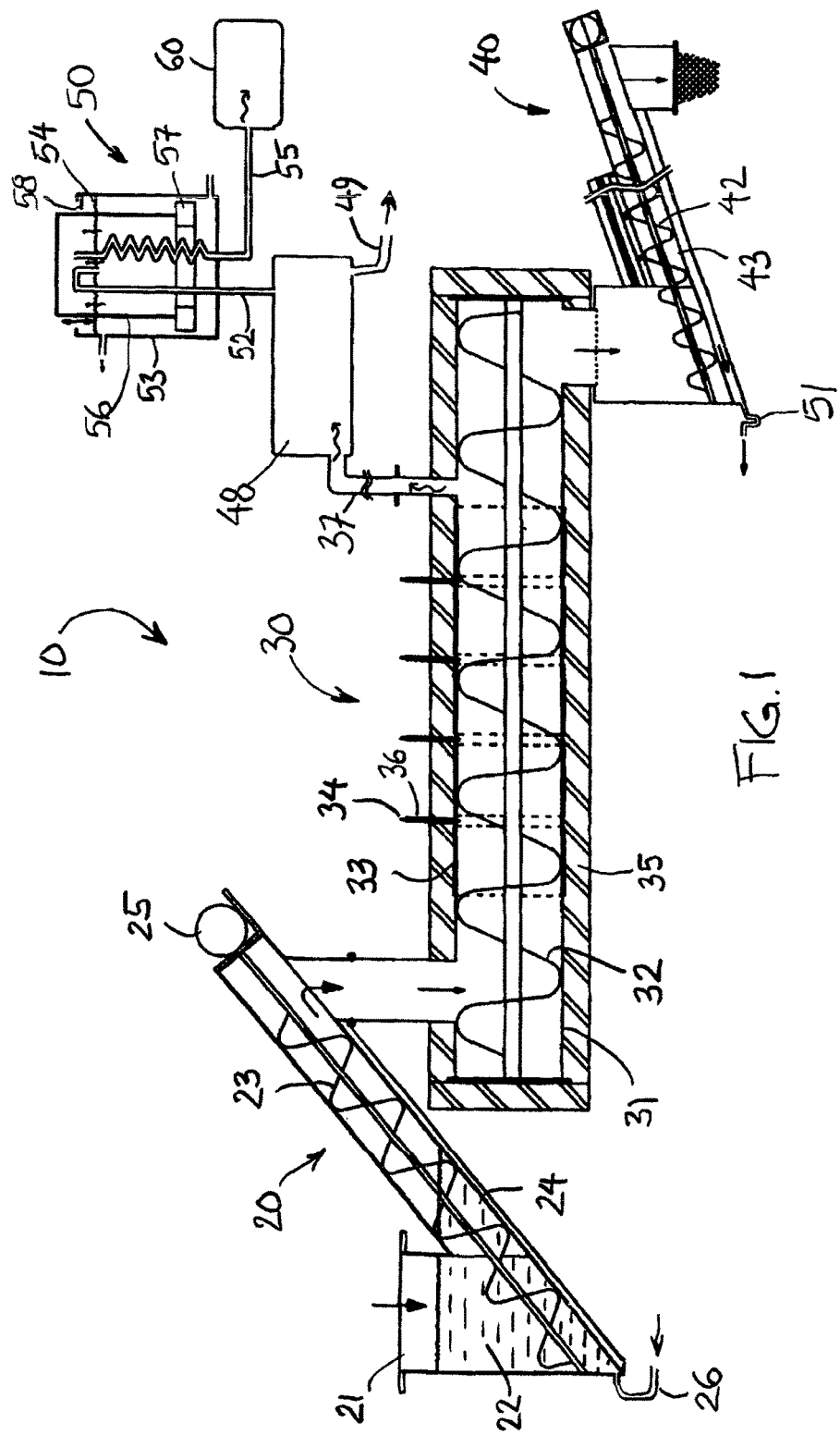
FIGS. 1-6 show a pyrolysis apparatus 10 according to the invention. In the feed device 20 of the pyrolysis apparatus 10 of FIG. 1, the feed material is poured into a bin 21 which contains a liquid 22 that is the most suitable for the process in terms of its chemical reaction properties. The liquid 22 is, most advantageously, a low-viscosity liquid that is as inert as possible, such as, for example, light fuel oil or water. In the bin 21, the level of the liquid 22 is so high that the liquid 22 forms a gas trap in a similar way as a drain trap, for example. The screw 23 of the screw conveyor located in conjunction with the bin 21 transports the material away from the bin 21 and transfers it into the process taking place in the reactor portion 30. The screw conveyor is sufficiently long and inclined and has at its bottom a gutter 24 or a gutter-like space along which the liquid 22 transported with the material and/or in the screw 23 can flow back into the bin 21.

The screw 23 of the screw conveyor of the feed device 20 of the pyrolysis apparatus 10 is rotated with a motor 25, the operation of which is controlled with a work-pause timer such that the movement of the screw is stopped from time to time. The material flow can then be controlled such that the screw 23 is only rotated for the desired length of time at a time, whereby only a small amount of material is transported forward quickly. During the movement, the material in a way sways and is shaken, after which the conveyor stops for a while, waiting for the liquid 22 transported with the material and/or the screw 23 to flow into the gutter and back into the bin 21. After that, the screw conveyor starts up again and the material transfer movement continues. The threads of the screw 23 of the screw conveyor do not go all the way to the end, as a result of which the material transferred by the screw 23 is compressed against the end of the conveyor. The compression of the material causes any liquid 22 that may still remain mixed in with the material to be removed before it can fall into the reactor 30. The liquid flows into the gutter 24 and through it back into the bin 21. The feed device 20 of the pyrolysis apparatus 10 has been presented in even more detail in FIG. 2 and its cross-section in FIG. 5.

The pyrolysis reactor 30 of the pyrolysis apparatus 10 is formed by a steel pipe 31, inside which a conveyor screw 32 is located. Heating resistors 33 that heat the pyrolysis reactor 30 have been located around the steel pipe 31 such that they have been tightened against the outer surface of the steel pipe 31. The heating resistors 33 are, for example, ceramic radiant heater bands that are most advantageously located inside a stainless steel sheet housing. The resistor output is controlled, for example, by a PID controlled control device, such as thyristor control or a semiconductor relay. The sensors 34 of the PID controllers, such as, for example, PT100 resistance temperature detectors or thermocouple-type sensors, are located in the sealed pipes 36 that have been fastened in the interstices between the resistors and that are connected to the reactor chamber located inside the steel pipe 31. The steel pipe 31 forming the reactor chamber has been thermally insulated, for example, by coating it throughout with insulation 35, such as heat-resistant industrial MT or HT insulation wool or ceramic wool. The pyrolysis reactor 30 of the pyrolysis apparatus 10 has been presented in more detail in FIG. 3. The vapourised material and pyrolysis gas is conducted, through an outlet pipe 37, from the pyrolysis reactor 30 out into a condensing column 48 and a gas collector 50, which have been presented in more detail in FIG. 4. The liquid condensed in the condensing column 48 is conducted into a collecting tank through a pipe 49.

The pyrolysis reactor 20 of the pyrolysis apparatus 10 is drained using the outlet portion 40 such that the carbon is discharged from the pyrolysis reactor 30 through a close-pitch discharge screw 42. The structure of the outlet portion 40 has been presented in more detail in FIG. 3B and its cross-section in FIG. 6. The discharge screw is sufficiently long and more closely pitched at its end and so tight against the casing pipe 43 that when it is full of the carbon that has become fine-grained during the process, oxygen can no longer enter back into the chamber of the pyrolysis reactor 30 through the casing pipe 43. The discharge screw 42 is surrounded by a sandwich casing structure that has, at its core, with the exception of the final end, a casing pipe 43 that is open at the top and has, at its upper end, a roof structure 44 which is permeable to vapour. Above it, as part of the outer casing, there is a steeply inclined, grooved or corrugated-steel-sheet-like collecting canopy 45 which is cooled by a liquid-cooled outer casing 46. The vapour is condensed into the collecting canopy 45 and flows along its inner surface into the casing pipe 43 and to the bottom end of the inclined conveyor. From the bottom end of the casing pipe 43 starts a pipe 51, formed by an oil trap bend, through which the liquid flows into the collecting system. According to the invention, some of the liquid collected can also be pumped back into the bin 21 of the feed device 20 through the pipe 26, because the screw 23 of the screw conveyor can transport small amounts of liquid 22 out of the bin 21.

Figure 4:
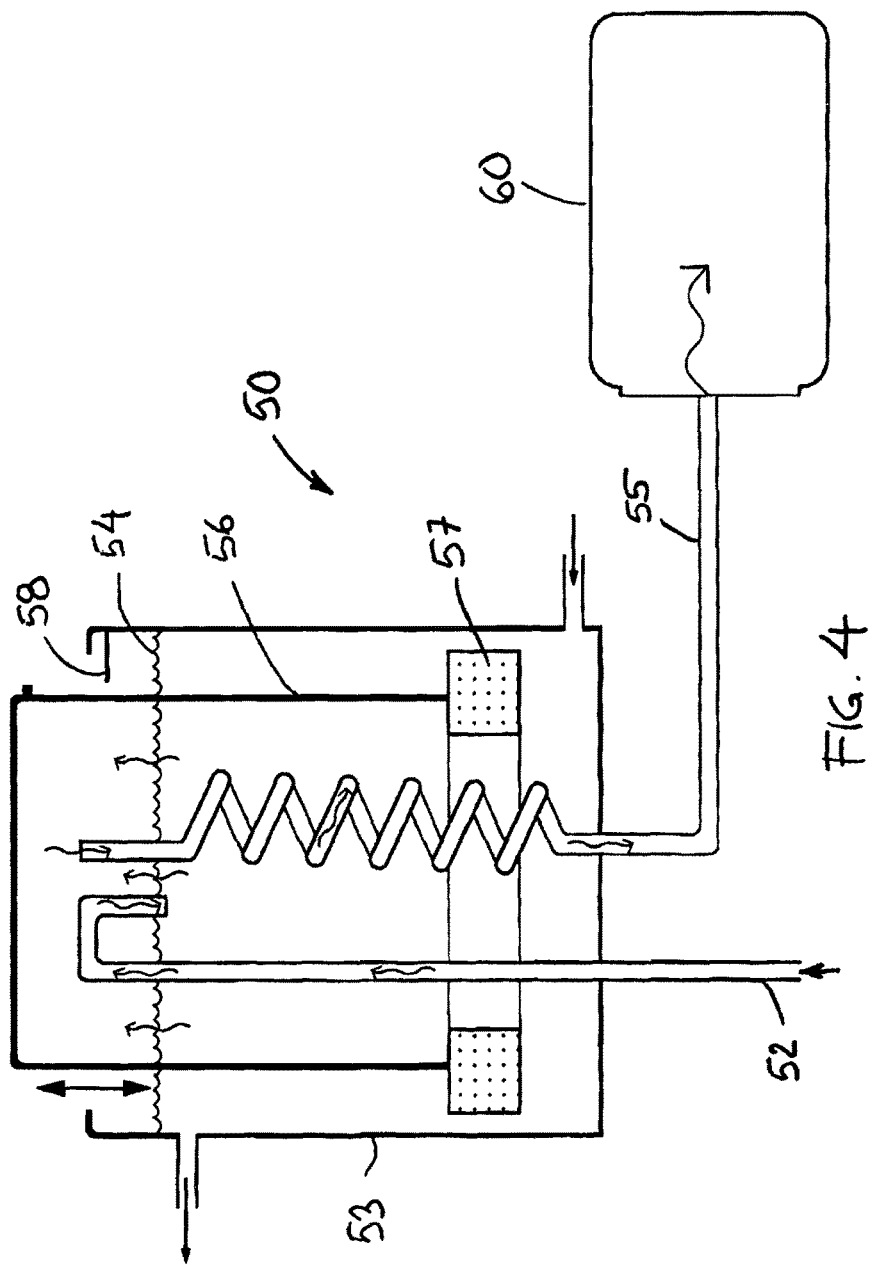

The removal and collecting of the gas generated in the reactor of the pyrolysis apparatus 10 takes place using the condensing column 48 and the gas collector 50, which have been presented in more detail in FIG. 4. At the very end of the system, after the columns, there is a gas outlet pipe 52 which runs in the gas collector 50 all the way up through the tub 53. The tub 53 has been filled with liquid 54, such as glycol, to which gas does not react. At the top end of the tub 53, the outlet pipe makes a U-turn downwards such that, when it sinks into the liquid, it creates a water trap effect, thus also preventing the entry of oxygen into the process that way. Another pipe 55 also enters through the bottom of the tub 53, ending next to the outlet pipe 52 at the same height in the upper level vertically without turning downwards. Another tub 56, which is as high but narrower, has been mounted upside down on the pipes inside the tub 53. This tub 56 has been equipped, at its bottom portion, with a float ring 57 which supports the tub 56 and lightens it so that it floats. The tub combination has been equipped with upper and lower limit switches 58 which control the gas outlet compressor 60, which sucks the gas accumulated in the upper tub 56 through the other pipe 55 sequentially away into the pressure tank when the other tub has reached the permitted upper point. When this happens, the other tub 56 descends, the compressor stops and the filling sequence starts again.

Figure 2:
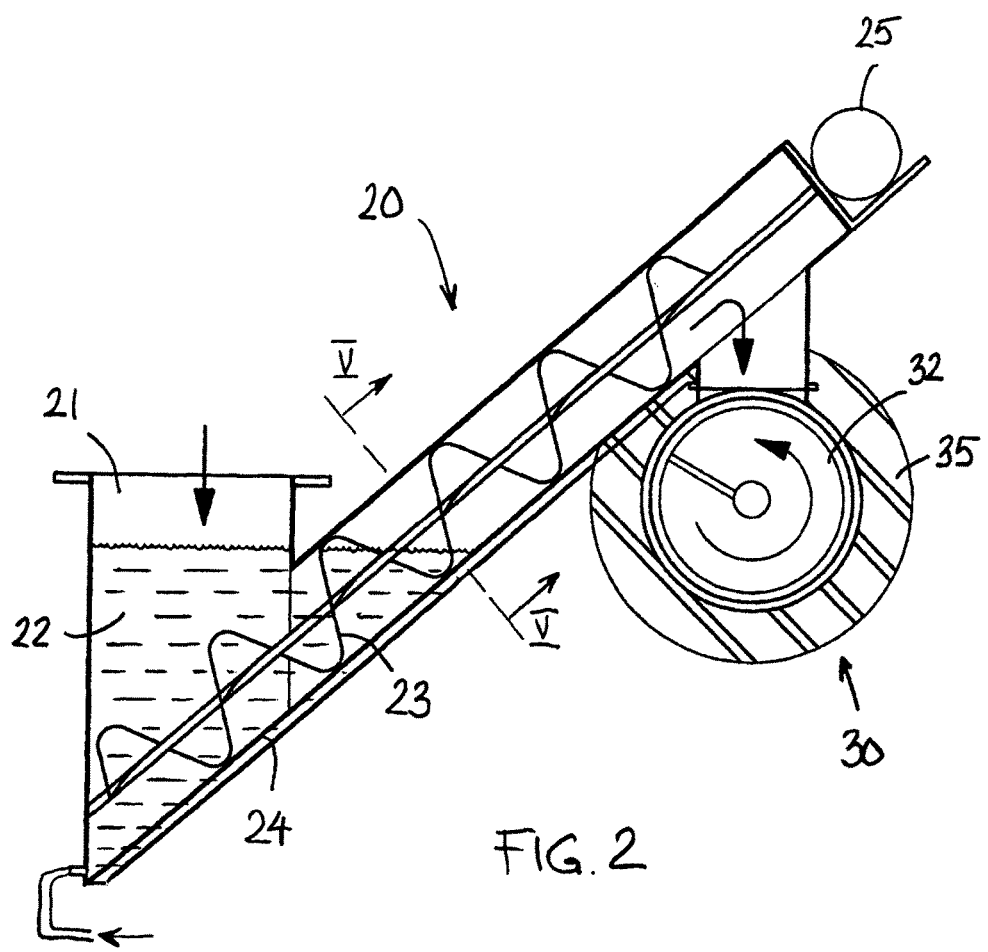
Figure 3:
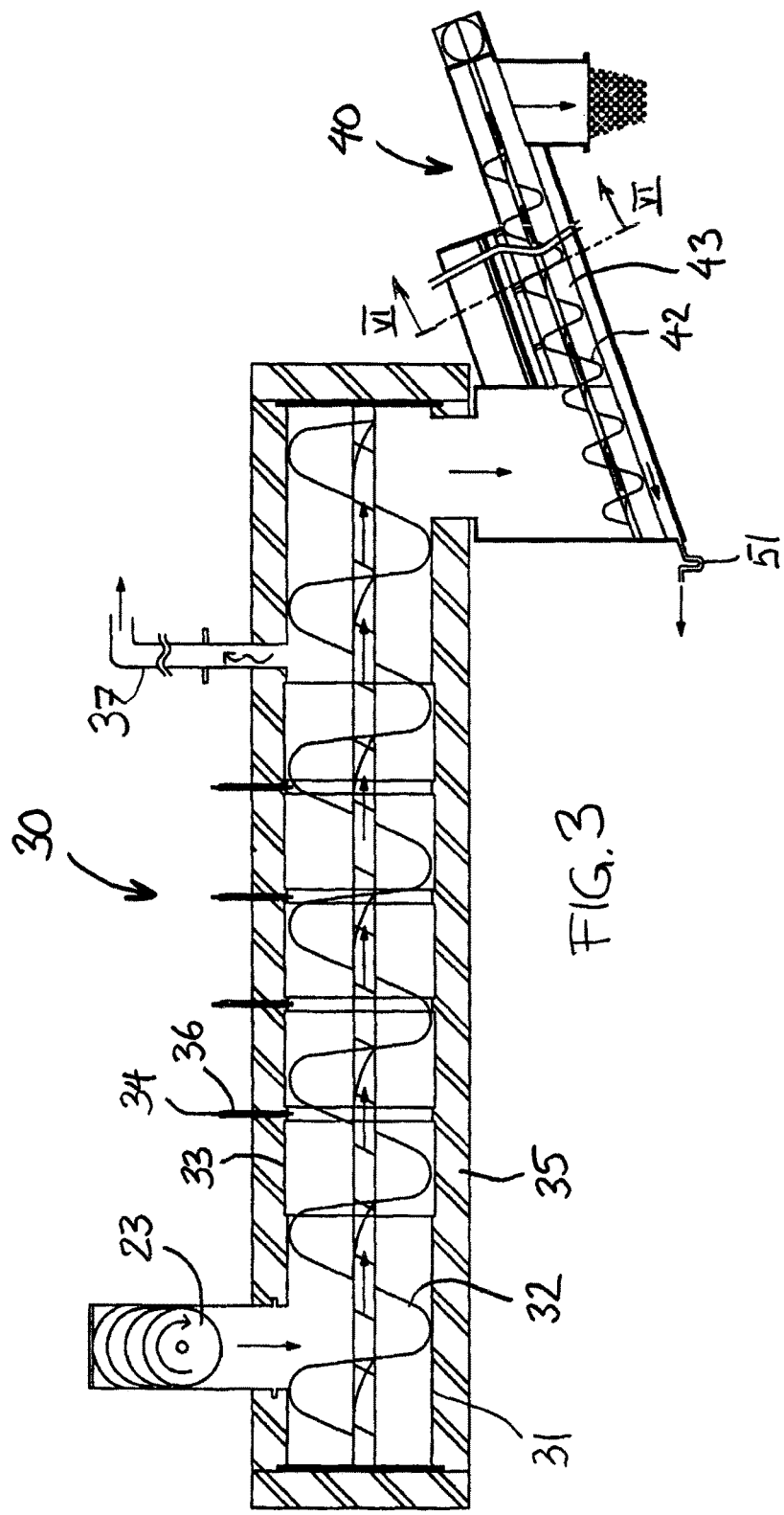
Figure 5:
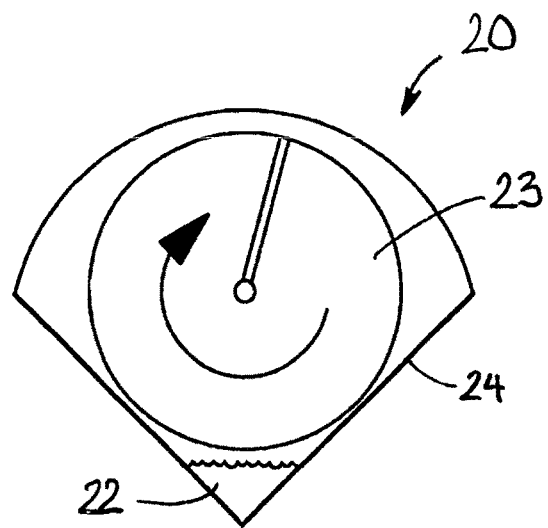
Figure 6:
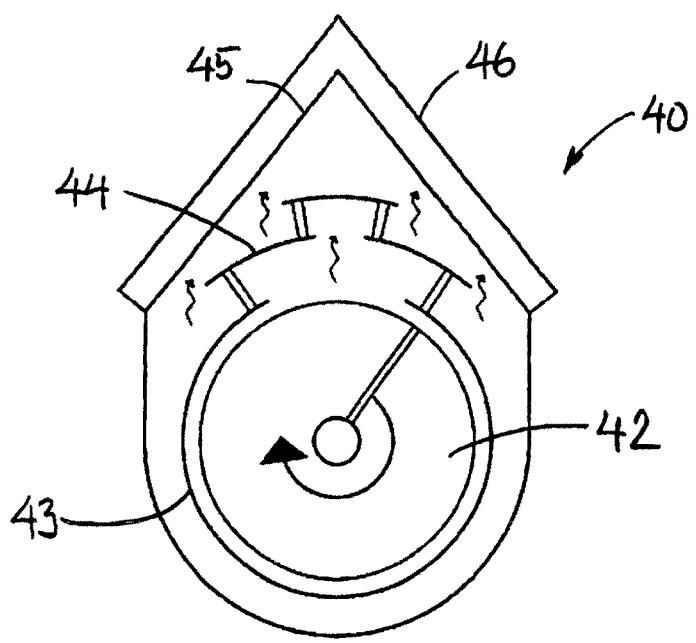

FIG. 5 shows the cross-section of the feed device 20 along the line V-V of FIG. 2 and FIG. 6 correspondingly shows the cross-section of the outlet portion 40 along the line VI-VI of FIGS. 3 and 3B.

As pyrolysis is often used to process materials that have poor thermal conductivity, such as shredded rubber, polyurethane, hay or sawdust in the production of biocarbon, it is advantageous to keep the heat transfer distances small, i.e. below 30 cm. Therefore it is not advantageous for the reactor cylinder's inner diameter to exceed 60 cm. According to the invention, the capacity increase is achieved using several parallel pyrolysis reactor cylinders.

In the pyrolysis apparatus's feed device according to the invention, the feeding of the feed material has been arranged air-tightly such that no air can enter into the process through the feed device. For this purpose, the feed device has an air trap which contains liquid. Liquid is added to the air trap in the beginning. During use, some liquid rises with the feed screw, but thanks to compressing the material and sequential operation, the majority of the liquid is caused to flow back into the feed device. Thanks to the oil return function in the feed device, the condensing collecting canopy in the outlet device and the advantageous method of heating the reactor, the efficiency of the pyrolysis apparatus according to the invention is good. Advantageously, the electric energy requirement per volume of oil produced is, for example, only approximately 0.5 kWh/l.

If required, a small amount of the liquid, such as oil, collected in the process, can be pumped from the collecting tank back to the feed device to replace any volume of liquid that may have exited with the screw, in order for the air trap to remain operational with the help of the liquid. The volume of replacement oil required for the air trap can be, for example, 10% of the oil obtained in the process.

In the pyrolysis apparatus presented above, screw conveyors have been used for transporting and taking forward the feed material in the process. However, other types of conveyors, such as scraper conveyors, can also be used. In this case, in the feed device, for example, part of the scraper conveyor can be placed in liquid to create a similar air trap as with the presented screw conveyor.

LIST OF REFERENCE NUMBERS

10 Pyrolysis apparatus
20 Feed device
21 Bin
22 Liquid
23 Screw
24 Gutter
25 Motor
26 Pipe
30 Pyrolysis reactor
31 Steel pipe
32 Conveyor screw
33 Heating resistor
34 Sensor
35 Insulation
36 Pipe
37 Outlet pipe
40 Outlet portion
42 Discharge screw
43 Casing pipe
44 Roof structure
45 Collecting canopy
46 Casing
48 Condensing column
49 Pipe
50 Gas collector
51 Pipe
52 Outlet pipe
53 Tub
54 Liquid
55 Pipe
56 Tub
57 Float ring
58 Upper and lower limit switches
60=Gas outlet compressor

The invention claimed is:

1. Pyrolysis apparatus (10) for processing shredded plastic and/or rubber waste, the pyrolysis apparatus (10) comprising a feed device (20), a pyrolysis reactor (30), an outlet portion (40), a condensing column (48), and a gas collector (50), and being characterized in that the pyrolysis apparatus (10) is continuous and
   the feed device (20) comprises a feed bin (21), an inclined conveyor having a conveyor screw (23) that is at least partially located in a liquid (22) in the feed bin (21), the liquid (22) forming an air trap to prevent air from entering into the pyrolysis reactor (30),
   the pyrolysis reactor (30) is formed of a steel pipe (31) and comprises a conveyor screw (32) arranged inside the pipe for moving the waste; and heating resistors (33) arranged against the outer surface of the steel pipe for heating the reactor, and
   the outlet portion (40) comprises a conveyor provided with a casing pipe (43) and a discharge screw (42) for removing carbon formed in the process, the casing pipe (43) being open at the top and having, at an upper end, a roof structure (44) which is permeable to vapour, and above the roof structure (44) an inclined, grooved or corrugated condensing collecting canopy (45).

2. Pyrolysis apparatus (10) according to claim 1, characterized in that the conveyor screw (23) is equipped with a timer which sequentially consecutively starts and stops the forward movement of the conveyor, such that the changes in the movement cause at least part of liquid transported with the material to flow back into the liquid contained in the feed bin (21).

3. Pyrolysis apparatus (10) according to claim 1, characterized in that the gas collector (50) has a tub (53) filled with liquid (54) and, placed in this tub, a collecting member, which is another tub (56) that is turned upside down and equipped with a float (57) to collect gas entering the gas collector.

4. Pyrolysis apparatus (10) according to claim 3, characterized in that the tub (53) of the gas collector (50) is equipped with upper and lower limit switches (58) that control a gas outlet compressor (60) connected to the gas collector (50) such that the compressor sucks the gas accumulated in the other tub (56) equipped with float (57) into a pressure tank when the other tub (56) equipped with the flotation device (57) reaches a permitted upper limit.

5. Pyrolysis apparatus (10) according to claim 1, characterized in that the steel pipe (31) forming the pyrolysis reactor (30) is thermally insulated.

\* \* \* \* \*